(12) United States Patent
Des Champs

(10) Patent No.: US 7,107,233 B2
(45) Date of Patent: Sep. 12, 2006

(54) SCRAP REDUCTION BY COMBINING OPERATIONS OF DIFFERENT MANUFACTURERS

(76) Inventor: Nicholas H. Des Champs, 1301 Brughs Mill Rd., Fincastle, VA (US) 24090

( * ) Notice: Subject to any disclaimer, the term of this patent is extended or adjusted under 35 U.S.C. 154(b) by 1036 days.

(21) Appl. No.: 09/864,198

(22) Filed: May 25, 2001

(65) Prior Publication Data

US 2002/0178065 A1    Nov. 28, 2002

(51) Int. Cl.
  *G06Q 30/00* (2006.01)
(52) U.S. Cl. .......................................... 705/26; 700/112
(58) Field of Classification Search .................. 705/26, 705/27
  See application file for complete search history.

(56) References Cited

U.S. PATENT DOCUMENTS

| | | | |
|---|---|---|---|
| 4,677,552 A | 6/1987 | Sibley, Jr. | |
| 4,725,961 A | 2/1988 | Pearl | |
| 4,941,183 A | 7/1990 | Bruder et al. | |
| 5,262,956 A | 11/1993 | De Leeuw | |
| 5,699,526 A | 12/1997 | Siefert | |
| 5,757,950 A | 5/1998 | Bruder | |
| 5,799,284 A | 8/1998 | Bourquin | |
| 5,802,497 A | 9/1998 | Manasse | |
| 5,918,214 A | 6/1999 | Perkowski | |
| 6,397,122 B1 * | 5/2002 | Lindstrom et al. | 700/145 |
| 6,580,963 B1 * | 6/2003 | Susnjara | 700/171 |
| 6,917,848 B1 * | 7/2005 | Nakayama et al. | 700/121 |
| 2001/0049634 A1 * | 12/2001 | Stewart | 705/26 |
| 2002/0133416 A1 * | 9/2002 | Abhyanker | 705/26 |
| 2002/0178065 A1 * | 11/2002 | Des Champs | 705/22 |

FOREIGN PATENT DOCUMENTS

EP   WO 2004/051523 A1 *   6/2004

OTHER PUBLICATIONS

Pinkham, Myra, "Yield to higher efficiency", Metal Center News, Sep. 2001.*

* cited by examiner

*Primary Examiner*—Mark Fadok
(74) *Attorney, Agent, or Firm*—Clyde I. Coughenour

(57) ABSTRACT

Scrap is decreased by a service provider collecting information on would-be scrap materials and sizes by first fabricators and work product needs by second users world wide. The first and second parties are informed of the needs and availabilities by the service provider. The service provider can match availabilities with needs, negotiate terms and prices, take bids, as well as negotiate disputes, run credit checks, track products and shipping schedules, review quality control, etc.

16 Claims, No Drawings

SCRAP REDUCTION BY COMBINING OPERATIONS OF DIFFERENT MANUFACTURERS

FIELD OF THE INVENTION

To maximize output when cutting stock material a service is provided whereby one manufacturer having a substantial amount of potential scrap can notify other manufacturers worldwide so that jobs that fit within the potential scrap area can be combined with others needs into one operation.

DESCRIPTION OF RELATED ART

For many years sheet metal parts were sheared from standard-size, precut sheets that were purchased and stocked for future use, either for specific projects or for general inventory. In some cases, especially with larger companies, coils of sheet metal were inventoried and sheets of specific lengths were cut from these coils after the material had been uncoiled and straightened through a leveling and shearing line.

Typically, a product, such as an air conditioning cabinet, will have numerous metal parts of different blank sizes. For reasons of cost, weight, and structural needs, the parts will be made from different gauges and different materials, such as steel, galvanized steel aluminum, or stainless steel.

In the past, when a job reached the fabrication department, the fabricator would review the material specifications; gather the appropriate sheets having the proper material properties and gauges; and then make an effort to layout the part blanks on the sheets, usually scaled and fitted on a sheet of paper first, to best utilize the initial sheet of metal. An experienced fabricator could layout the blank parts on the sheets and, after shearing the blanks from the sheets, would end up with 20 to 30 percent scrap, or drop-off.

However, after he finished shearing blanks from the sheet, the scrap pieces left over from that sheet would generally be sheared into rectangular pieces that would also be inventoried in an informal manner for later use. These squared pieces, would be saved by stacking them against a wall somewhere. When the next job came along, there would be an attempt to use these many different sizes of squared-drop-off pieces to fabricate the new parts. If the fabricator had a good memory and a decent method of inventorying these smaller squared pieces, the overall scrap could be decreased to as low as 10 percent.

During the 1970s numerically controlled punch press machines (NCR machines) were beginning to be used to put holes in metal. After the metal blanks were sheared to size, the blanks were clamped to the bed of the machine and the programmed holes and notches were cut. As with any new industry, NCR machines improved and the software that controlled the operations improved. During the 80s and 90s, the increasing experience of the designers and fabricators, coupled with the improved capabilities of the NCR machines, have essentially eliminated the shearing operation from the fabrication process. Now, in almost every case, the full size sheet of inventoried metal is placed onto the NCR machine and sheared as well as punched. After all of the holes are punched into the full size sheet, a shearing tool within the NCR machine then blanks out each part from the main sheet. All of this takes place while the full sheet is clamped to the base of the NCR machine.

When the sheet is finished being punched and sheared it is taken from the table. The blank parts are separated from the sheet by clipping the tabs that hold the skeleton and parts together until the punch and shear process is complete. The skeleton of remaining material is then discarded. There is no attempt to salvage any of the material left in the skeleton. The reason that there is no attempt at reusing any of the remaining metal is that the system no longer accommodates, nor tolerates, trying to find pieces that are worth saving, taking them to a shear, squaring them, and then adding these smaller pieces of material to an inventory that is maintained with the CAD system database.

In essence, if the material in a base-sheet metal that is loaded into the NCR machine is not programmed for use while the full sheet is on the NCR machine table, then it is destined to become scrap. Consequently, scrap rates have increased considerably within the sheet metal fabrication industry. It is not uncommon now for scrap rates to exceed 25 percent.

There are attempts by some companies, that have material that is unused on a sheet, to use the material for smaller, standard parts that are used on various and sundry standard products that are manufactured by the company on a continuing basis, such as hinges, flanges, etc. This aids in reducing scrap but there are not enough of these standard parts to reduce the scrap an appreciable amount.

The use of automatic equipment for reducing scrap or optimizing stock material use is common with D. Pear. U.S. Pat. No. 4,725,961, issued 16 Feb. 1988, and Bruder et al, U.S. Pat. No. 4,941,183, issued 10 Jul. 1990, and P. De Leeuw, U.S. Pat. No. 5,262,956, issued 16 Nov. 1993, and W. Bruder, U.S. Pat. No. 5,757,950, issued 16 May 1998, examples.

The use of computer, the Internet, satellite and communications for trade manageing resources services, products, brokerage activities and general business activities are now common activities with H. Sibley, Jr., U.S. Pat. No. 4,677,552, issued 30 Jun. 1987, and D. Siefert, U.S. Pat. No. 5,699,526, issued 16 Dec. 1997, and R. Bourquin, U.S. Pat. No. 5,799,284, issued 25 Aug. 1998, and M. Manasse, U.S. Pat. No. 5,802,497, issued 1 Sep. 1998, and T. Perkowski, U.S. Pat. No. 5,918,214, issued 29 Jun. 1999, examples.

SUMMARY OF THE INVENTION

The present invention reduces scrap by bringing together various manufacturers in a cooperative effort to reduce manufacturing costs. If all the companies within the world that needed parts had knowledge of the available materials, gauges and sizes of unused blank spaces on a sheet of metal while it is still on the NCR machine table, then this unused space could potentially be converted to useful products. If the fabricator had knowledge of parts, requirements of other fabricators and product manufacturers, then these could partly be programmed into the sheet cutting machines prior to the punching and shearing operation. With a large database of desired parts available to the fabricator, the sheet could be programmed in a manner that would allow the sheet to be utilized to have less than 5 percent scrap.

This invention therefore uses a website to establish a central repository of parts required and blanks available where a match can be made. People or individuals throughout the world who need parts manufactured, notify the intermediary having the website. Manufacturers who have blank sections of sheet material available also notify the intermediary. The intermediary uses the website to bring together the people needing parts with the manufacturers having blank sections available to make the parts. The parts are manufactured at a reduced cost because the material, if not used, would otherwise become scrap.

DESCRIPTION OF THE PREFERRED EMBODIMENTS

The invention is accomplished by use of a service provider having a website that has several databases. One database stores the requirements of parts users, another database stores available blanks of fabricators, and a third database uses the first two databases to match need with availability. Many other components of the system are required to enable parts delivery information. These include ordering parts, acceptance of orders, invoicing the fabricator for commissions on parts, tracking jobs, checking credit worthiness, establishing parts price, handling shipping requirements, matching time of availability with parts delivery, and assuring that quality standards are met. In addition, the system is also involved with other operations on the metal parts, such as forming and painting that will allow delivery of a completely finished part.

The general basic procedure to be followed is: (1) One manufacturer planning a run that includes specific use or work areas and areas of potential scrap registers the work and potential scrap area dimensions, material, thickness, etc., with the service provider. (2) The service provider then records the information and makes it available on the world-wide-web or other communications network. (3) Any other manufacturer in the world that is in communication with the service provider compares the available work area with jobs they are going to run. (4) The other manufacturer notifies the service provider of their job run dimensions, materials, thickness, etc. (5) The service provider coordinates or communicates the several needs of the manufacturer to the appropriate parties taking into account the various concerns and requirements the several manufacturer may have. Examples of how the system works follow.

EXAMPLE 1 a) A Florida company, a fabricator, has scheduled a run of 5,000 water coolers to occur over the next three months.

b) During the prototype run by the fabricator, it is determined that there will be 5,000 blanks of 20 gauge alloy 304 stainless steel having dimensions of 13 inches by 26 inches that cannot be used.

c) It is estimated by engineering that the purchased material value of the expected drop-off will be $29,811. The actual scrap value received from the scrap dealer would be $3,000. They would prefer to utilize this material in some fashion but have no small parts that they can program into the sheet.

d) the purchasing personnel at the fabricator learn of the upcoming potential scrap being generated, the size, the material and gauge and the dates that the material will be available to make parts for someone. They let the service provider know of the upcoming material availability.

e) The service provider enters the pertinent information into its system and reviews availability.

f) If there is not already a request for parts that would utilize this material then the availability of blanks, or the availability of remaining blanks if a partial requirement for the blanks is already known by the service provider, is placed on the service provider's database and made available to all manufacturers and fabricators worldwide.

g) An Illinois manufacturing company that makes electrical distribution components is planning to manufacture a quantity of 200,000 electrical boxes using 20-gauge, alloy 304-stainless steel. The blank size of the box, before it is formed, is 6 inches by 8 inches. The cover for the box has a blank size of 3 inches by 5 inches. The manufacturing engineer overseeing the project reviews the service provider's database. It is determined that an average of 5 complete electrical boxes can be cut from each 26 inch by 13 inch available blank. The run will be made over a 2-month period.

h) With 50,000 13-inch by 26-inch blanks available over a three-month period, at a potential reduced cost over making the parts from virgin material, the engineer decides it will not affect the production program if parts are purchased through the service provider. The blanks available will allow 250,000 electrical boxes to be made. A decision is made to increase production to 250,000 boxes since the increase of 50,000 will result in only a six months inventory extension, but with the potential cost savings in material it presents an unusually good investment.

i) The electrical components manufacturer contacts the service provider to determine the price for the boxes if all 50,000 available blanks, and the corresponding parts, are purchased.

j) The service provider requests the parts data from the components manufacturer, so that the fabricator can determine machine time and a firm price.

k) The fabricator is interested in recovering his price for the material plus the cost of tool wear and some machine and handling time. The price he requests is the cost of material plus 30 percent. The service provider marks up the price from the fabricator by 10 percent and passes the cost to the manufacturer of the electrical boxes. The manufacturer estimates that he will be saving 30 percent over making the boxes within his own plant.

l) The manufacturer checks with the service provider to confirm delivery dates and acceptability for the parts.

m) The manufacturer places a request for the parts with the service provider.

n) The request for parts is sent to the fabricator.

o) The fabricator reviews the terms of the request and concurs that it can meet the delivery schedule and the part specifications.

p) The service provider informs the manufacturer that the fabricator has accepted the request and that they should place an order for the parts with the fabricator with a copy sent to the service provider.

q) Manufacture and delivery begin, with the fabricator sending invoices directly to the manufacturer with copies to the service provider.

r) Upon payment to the fabricator by the manufacturer, the fabricator makes payment of 10% of the invoice value to the service provider for the services rendered in matching the needs of the two companies.

s) Shipment costs are born by the manufacturer or as otherwise agreed to.

t) The service provider assists in remedying disputes regarding shipment, quality, quantity, etc.

EXAMPLE 2 a) A supplier of automotive aftermarket parts has, as its main business, the packaging of bolts, nuts, and heavy gauge metal parts to supply kits for attachments of exhaust systems, tow bars, trailer hitches, springs, etc. to a truck or automobile chassis.

b) Normally, the supplier would take bids from several fabrication shops for the thousands of heavy gauge sheet steel parts that would typically have 4 to 10 punched holes that would range in size from a 4-inch by 4-inch square to an 8-inch by 16-inch piece with formed 1-inch bends on all four sides.

c) After finding out about the reduced parts cost when using the service provider, the supplier sends in his request, using the service provider's Order form, for a quantity of 2500 each of 6 different heavy gauge sheet metal parts, together with specifications that show tolerance, gauge, material, and all dimensions.

d) The service provider places the parts request on the central Website database for fabricators the world over to see.

e) Within two business days, responses show up on the Website indicating that all parts requested by the automotive parts supplier can be delivered within one month. Two fabricators can supply the needs of this parts request.

f) A price is negotiated between the fabricators and the service provider and then forwarded to the automotive supplier.

g) The automotive supplier places a purchase order with the two companies that will be supplying the parts. A copy of the orders is directed to the service provider.

EXAMPLE 3 a) A fabricator has an upcoming job that results in two blank sections on a 10-gauge, 6061 T aluminum alloy sheet. There will be 2500 sheets run and the blank sizes are 8½ inches by 14 inches and 11 inches by 30 inches.

b) Instead of waiting for the service provider to find a parts match for these blanks, the fabricator decides to use the service provider's Website Auction feature to attract buyers of the blanks, which has a metal cost of $16,837.

c) The fabricator decides to put a minimum bid of $16,837 plus 3 cents per machine tool stroke above the strokes required to shear the blanks from the skeleton. For instance, if the bidder desired a total of three parts from the two blank section with a total of 15 holes and notches; the minimum bid would be about $19,000. With commission due, the minimum acceptable bid to the fabricator is $21,100. Normally, a buyer would pay much more than 15 percent over material cost for parts.

d) It is agreed to have the auction run for one week. The highest bid, above the minimum bid, will be accepted at that time.

e) At the end of the week the bid had worked up to $24,000. It was accepted. The cost to the fabricator to punch holes and shear was estimated to be $2,500 above material cost and blank shearing.

f) If the fabricator had elected not to use the service provider's service, it would have scrapped the blanks and received a scrap value of about $4,300.

EXAMPLE 4 a) A manufacturer of computer-room air conditioners has just received an order for $26,000,000 of product for a large communications switching station. The annual sales level of the manufacturer averaged $20,000,000 per year for the past three years. They do not have the fabrication capacity to handle the order within the 9-month delivery period.

b) The manufacturer decides that the most expedient route to achieving its delivery and profit goals is to utilize the service provider and have a Reverse Auction on their site. They are interested in obtaining the fabricated pieces in the flat only. They are not interested in having someone else forming or finishing since they have the capacity to perform these operations. In additional formed and painted pieces are more difficult to transport.

c) The manufacturer sends data, including all of the information needed to make the parts, to the service provider.

d) The service provider places all of the information on the central database and highlights a REVERSE AUCTION feature. The bidding is allowed for a four-week period.

e) As the Auction begins, the manufacturer can see the prices being bid on a central matching database.

f) At the end of the four-week period, if prices have been bid and are satisfactory, an order will be negotiated between the manufacturer and the successful bidder. The service provider will receive a commission as the fabricator is paid for the material shipped.

The procedures enable both manufacturers and consumers to reduce the cost of doing business by reducing the amount of scrap generated.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A scrap reduction procedure comprising:
providing a repository for collecting information on materials, sizes and thicknesses available by first fabrication parties;
providing a repository for collecting information on materials, sizes and thickness needs of second user parties;
providing a means for communicating said materials, sizes, and thicknesses available to said second user parties and said materials, sizes, and thicknesses needed to said first fabrication parties to each other;
providing a means for receiving responses to said materials, sizes, thicknesses available from said first fabrication parties and said materials, sizes, thicknesses needed by said second user parties;
communicating said responses to an appropriate said first party or said second party;
reducing scrap by determining said first fabrication parties unused blank material and making that remaining unused blank material available to said second user parties for fabricating said second user parties product needs negotiating agreements between said first parties and said second parties for offers made, and processing offers from said first parties to perform work for said second parties; fabricating said first fabricators needs and said second user parties needs in one continuous operation.

2. A scrap reduction procedure as in claim 1 including:
processing offers from said second parties to have work performed by said first parties.

3. A scrap reduction procedure as in claim 1 wherein:
said responses may be in the form of bids by a first party fabricating work products;
including tabulating said bids to fabricate work products and communicating acceptable bids to fabricate to a said second party.

4. A scrap reduction procedure as in claim 1 wherein:
said responses in the form of bids by a said second party for having work products fabricated;

including tabulating said bids to have work fabricated and communicating acceptable bids to a said first party;
fabricating said first fabricators needs and said second user parties needs simultaneously.

5. A scrap reduction procedure as in claim 1 including:
providing a means for communicating said materials and sizes availabilities of said first parties and said materials and size availabilities of said second parties on a worldwide basis.

6. A scrap reduction procedure as in claim 1 including:
matching said work to be done size and materials of said second parties with said potential scrap size and materials of said first parties,
informing said first parties and said second parties of the needs and availabilities of the other's materials and size availabilities that overlap or coincide.

7. A scrap reduction procedure as in claim 1 including:
brokering an agreement between one of a said first parties and one of said second parties to cooperatively reduce said scrap amount.

8. A scrap reduction procedure as in claim 7 including:
negotiating any disputes that arise between one of said first parties and one of said second parties.

9. A scrap reduction procedure as in claim 1 including:
matching said work to be done size and materials of said second parties with said potential scrap size and materials of said first parties;
informing said first parties and said second parties of the needs and availabilities of the other's materials and size availabilities that overlap or coincide;
using a worldwide database to inform said first parties and said second parties of the other's needs and availabilities;
brokering an agreement between one of a said first parties and one of said second parties to cooperatively reduce said scrap amount.

10. A scrap reduction procedure as in claim 1 including:
providing assistance to said first parties and said second parties in ordering and invoicing transactions.

11. A scrap reduction procedure as in claim 1 including:
performing credit checks for said first and second parties.

12. A scrap reduction procedure as in claim 1 including:
providing a means for communicating said materials and sizes available from said first parties and said materials and sizes needed by said second parties on a worldwide basis;
negotiating agreements between said first parties and said second parties for offers made;
performing credit checks for said parties; providing assistance to said first parties and said second parties in ordering and invoicing transactions;
reviewing work for quality compliance;
tracking production and shipping scheduling for timeliness;
fabricating said first fabricators needs and said second used parties needs in one continuous operation.

13. A scrap reduction procedure as in claim 9 including:
performing credit checks for said first and second parties;
tracking production and shipping scheduling for timeliness;
reviewing work for quality compliance.

14. A scrap reduction procedure as in claim 1 including:
fabricating the needs of said second user party from unused blank space available while fabricating the needs of said first fabricating party.

15. A scrap reduction procedure asin claim 1 including:
programming into a sheet cutting machine the needs of both said first fabricating party and said second user party for concurrent fabrication of the needs of both said first fabricating party and said second user party.

16. A scrap reduction procedure as in claim 1 including:
providing a website with three databases, one first database for fabrication space information available on blanks of said first fabricator, one second database for fabrication space information requirements for second users and one third database for comparing the information contained in said first database with information contained in said second database.

* * * * *